Nov. 26, 1963    R. M. COX ET AL    3,111,962
PRESSURE REGULATING VALVE
Filed Nov. 16, 1959    2 Sheets-Sheet 2
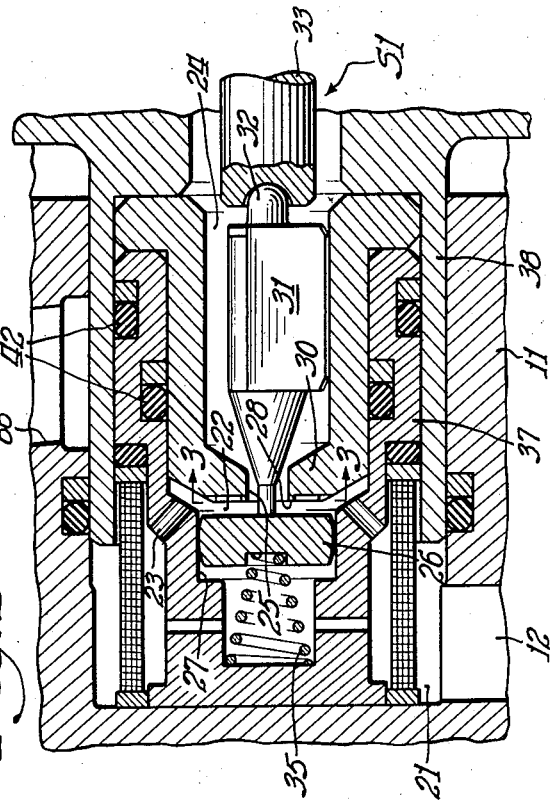
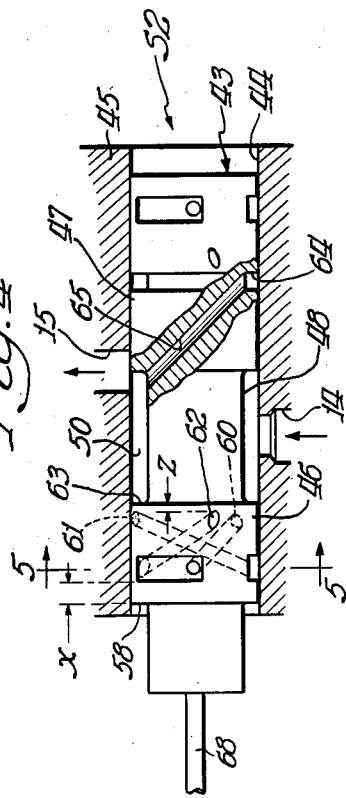
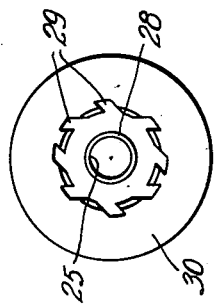
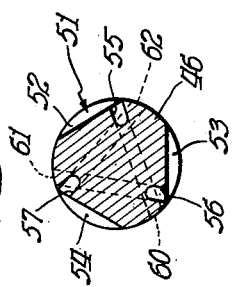
Inventors:
Robert M. Cox
and Roy L. Burton
By: Joseph R. Dwyer Atty.

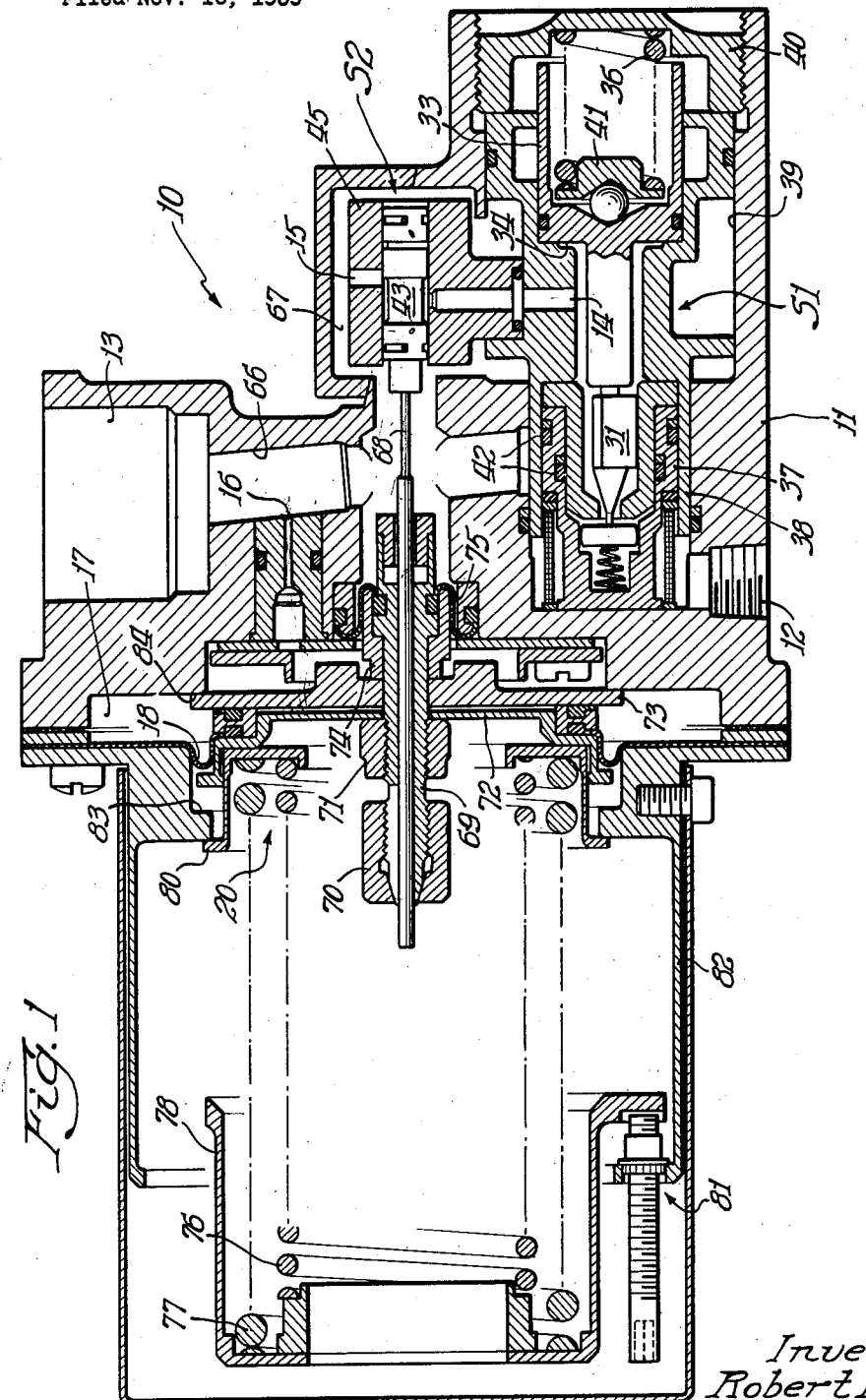

United States Patent Office 3,111,962
Patented Nov. 26, 1963

3,111,962
PRESSURE REGULATING VALVE
Robert M. Cox, Northridge, and Roy L. Burton, Woodland Hill, Calif., assignors to Weston Hydraulics, Ltd., Van Nuys, Calif., a corporation of California
Filed Nov. 16, 1959, Ser. No. 853,117
2 Claims. (Cl. 137—505.18)

This invention relates, in general, to pneumatic valves and in particular to a new and improved pneumatic pressure regulator valve.

It is a principal object of this invention to provide a new and improved pneumatic valve having means for accomplishing a minimum of variation in the output pressure of the valve with large variations in input pressure or output flows of the valve.

Another object of this invention is the provision of a pneumatic valve having incorporated therein a new and improved spool type valve with an improved air bearing reducing the friction involved in operating the spool, thus increasing the sensitivity of the output stage of the valve.

Still another object of this invention is the provision of a pneumatic valve having incorporated therein a new and improved spool type valve having means defining a new and improved air bearing eliminating the hazards of galling dry metal-to-metal running surfaces and reducing the amount of air necessary to accomplish an air bearing over conventional air bearings.

Still another object of this invention is the provision of a spool type valve having an air bearing in which is provided a means of metering or throttling the air utilized to accomplish the air bearing which therefore materially increases the advantage of a pneumatic valve particularly if used where the pressure supply is limited in quantity.

Briefly, this invention comprises a diaphragm operating a spool which includes an air bearing so that the friction involved in operating the valve is considerably reduced, with the diaphragm and spool so constructed and arranged it is subject to a minimum of pressure variations.

The air bearing forming part of this invention is so constructed and arranged to cooperate with the spool itself to meter the flow of air necessary to accomplish the air bearing and thus increase the advantage of the valve as will be explained in more detail hereinafter.

Other objects, advantages and novel features of our invention will become apparent upon consideration of detailed discussion taken in conjunction with the accompanying drawings wherein:

FIG. 1 is a cross sectional semi-schematic illustration of the two-stage valve constructed in accordance with the teachings of this invention;

FIG. 2 is an enlarged detailed view of the inner construction of the first stage or input valve of the two-stage valve;

FIG. 3 is an end view of a portion of the input valve taken along line 3—3 of FIG. 2 and looking in the direction of the arrows;

FIG. 4 is an enlarged detailed view of the second stage or output valve illustrating to advantage the air bearing spool; and FIG. 5 is a cross sectional view of the spool taken along line 5—5 of FIG. 4 and looking in the direction of the arrow.

Turning now to the drawings and in particular to FIG. 1 it can be seen that the two-stage valve illustrated therein is identified in its entirety as 10 and comprises a body 11 having a main inlet 12 and a main outlet 13. A first stage or input valve, indicated in its entirety as S-1, is in communication with the inlet 12 and is provided with an outlet 14 which opens into and forms an inlet for the second stage or output valve, indicated in its entirety as S-2. Thus, air under pressure entering the inlet 12 is first regulated by input valve S-1 before being discharged into the outlet 14. Air regulated by the second stage valve S-2 passes through its respective outlet 15 and finally into the main outlet 13. A portion of the pressure in the main outlet 13 is metered by a relatively small passage 16 which communicates with a motive pressure chamber 17 to actuate a diaphragm means 18 against a plurality of regulating springs 20.

Turning now to FIGS. 2 and 3, showing the main valve S-1, enlarged to show its detail, it can be seen that the main valve inlet 12 is in open fluid communication with an inlet chamber 21 which in turn is in open communication with a valve inlet chamber 22 through a plurality of passages 23. Suitable filter means are interposed between chambers 21 and 22 to prevent contamination of air entering the valve inlet chamber 22. Valve inlet chamber 22 is in communication with the valve outlet chamber 24 through the valve orifice 25. A poppet 26 slidable in a cylindrical bore 27 moves to and from its valve seat 28 to regulate the flow of fluid through the orifice 25. Means in the form of flutes 29 (FIG. 3) are provided on the valve seat 28 to permit the flow of air past the aligning ring 30 to the seat face.

Poppet 26 is operatively connected to a slide means 31 of smaller circumference than the inner diameter of outlet valve chamber 24 which in turn is operatively pivotally connected at 32 to a piston 33 (FIG. 1).

As can be seen in FIG. 1 the piston 33 is in open communication with the pressure in the outlet valve chamber 24 so that the air therein reacts against the piston surface 34 to slidably move the poppet 26 in response to pressure in the chamber 24. Poppet 26 on its side opposite from the valve seat 28 is biased by compression spring 35 while at the same time the piston 33 is actuated in the opposite direction by a larger spring 36, to regulate the pressure in the output passage 14 to the second stage valve S-2 by the movement of the poppet to and from its valve seat 28.

As can be seen in FIGS. 1 and 2 the entire arrangement of valve S-1 is accomplished by a plurality of telescoping sleeves 37 and 38 which fit into a bore 39 in body 11 for ease of assembly. A threaded cap means 40 is used to hold the arrangement in unison as well as to regulate the tension on the spring 36 reacting against cap means 40 and spring retainer 41. Also, suitable sealing rings indicated in their entirety as 42 are disposed about in the valve S-1 where leakage might occur.

In the practical embodiment of this invention, it has been found that the inlet pressure entering the inlet 12 can vary from 3000 to 300 p.s.i. and the pressure regulated by valve S-1 may be released at pressure varying from 300 to 400 p.s.i.; the purpose of valve S-1 being to reduce the pressure entering valve S-2 where it may be regulated thereby in a smaller range and with greater accuracy.

Referring now in particular to FIGS. 4 and 5 it can be seen that second stage valve S-2 is provided with a spool or shuttle 43 slidable in a valve bore 44 provided in a housing 45. Spool 43 is provided with a pair of lands 46 and 47 spaced apart and connected by a central reduced portion 48. Lands 46 and 47 define a valve chamber 50 between which is an open communication with the passage 14 from valve S-1 and one of the lands is so arranged that slidable movement of the spool will serve to meter the flow of air out the valve outlet 15.

Valve land 46 is provided with a plurality of cavities (three shown and indicated in their entirety as 51) disposed about the periphery thereof. These three cavities 52, 53 and 54 open outwardly and form chambers with the bore 44 and are each respectively indirectly connected to the air pressure chamber 50 by diagonally disposed bores 55, 56 and 57. It is to be noted that each of these cavities 52, 53, and 54 is spaced a distance, such as $x$, from the outer end 58 of the land 46. These cavities are also disposed at equi-angular distances from one another about the periphery of the land, as more clearly shown in FIG. 5 and are disconnected from each other so that each of the cavities is independently in communication with their respective passages 55, 56 and 57. Passages 55, 56 and 57 terminate inwardly at 60, 61 and 62, respectively, a slight distance such as $z$ of the inner end 63 of the land 46 so that air under pressure from the pressure supply in chamber 50 must travel a slight distance $z$ over the land before it enters the passage. In like manner, any air that would tend to leak from any one of the cavities must travel the distance $x$ before it reaches the end of the spool 58. The traveling of the air the distance $z$ prior to its entry into the respective passages and the distance $x$ that the air must travel upon leaving the respective cavities towards the ends of the spool forms a means of throttling the flow both in and out of the passages and cavities. In a sense, the distances $z$ and $x$ are variable continuations of passages 55, 56 and 57 utilized to throttle the flow to and from the cavities.

In this valve S–2 it is to be noted that each of the cavities 52, 53 and 54 is supplied with air pressure from a bore having its inlet diagonally opposite thereto as is shown in FIG. 5. Thus, as more clearly illustrated in FIG. 4, if the clearance between the top of bore 44 and the top of the land 46 is increased and the clearance at the bottom is decreased, more flow into the inlet 61 from the chamber 50, and reduced flow from the cavity 53 over the distance $x$ to outlet, i.e., the end 58 of the spool will produce higher pressure in cavity 53. Similarly, if the clearance between the top of the bore 44 and the top of the land is decreased and the clearance at the bottom is decreased, less flow into the inlet 61 from the chamber 50 and more flow from the cavity 53 over the distance $x$ to outlet, i.e., the end 58 of the spool, will produce a lower pressure in cavity 53. Thus, by reason of the inlet to each of the passages located diagonally opposite from its respective cavity and the outlet being on the same side as the cavity, the control of flow has a push-pull effect on the pressure. This push-pull results in a double gain in sensitivity which is considerably increased over conventional air bearings.

In one embodiment of this aspect of our invention, a spool such as 43 which is lap fitted into a bore such as 44 with a clearance of 0.0001 to 0.00005 forms a means of throttling and floating the spool in air in actual practice.

Land 47 of the spool 43 is also provided with means defining a similar bearing arrangement; however, by reason of the location of the outlet 15 with respect to the chamber 50, a peripheral groove 64 is provided in open communication with the chamber 50 by a passage 65 extending diagonally of the spool. This groove 64 provides a force of pressure for the cavities at the same pressure value as that in chamber 50 and by-passes the outlet 15 to prevent any interference with the normal functioning of the spool.

By reason of the fact that the cavities and passages in land 47 are identical with the passages and cavities forming the bearing means in the land 46 and function identically, no further description is deemed necessary.

Thus, it can be seen that the spool valve forming part of second stage valve S–2 is provided with an air bearing means which literally floats the spool or shuttle within the valve bore 44. This bearing means, by reason of being supplied with supply pressure from the air which is regulated by S–1 and by reason of the throttling to and from the cavities forming the air bearing utilizing the clearance between the spool and the bore, provides greater sensitivity or force gain than conventional types of bearings. Too, the operating force necessary to move this spool during operation of the valve is measurably reduced and metal-to-metal contact of the parts has been prevented which eliminates the hazards of galling dry running surface such as used in conventional spool type valves. The reduction in the amount of air required for an air bearing over a conventional air bearing is an important aspect of this invention since it reduces the loss of air in the valve if the supply is limited.

Air under pressure from the outlet 15 is communicated to the outlet 13 from passage 66 which in turn is in open communication with the chamber 67 into which the outlet 15 opens.

Movement of the spool 43 is accomplished, in the embodiment illustrated, by a flexible rod or coupling 68 attached at one end to the spool 43 and received at the other end in a sleeve member 69. Sleeve member 69 is externally threaded to receive a threaded collet 70 which removably affixes the rod 68 in the sleeve 69. A nut 71 also removably affixes the sleeve 69 to a backing plate 72 by urging the backing plate 72 against a stop plate 73 and an outer sleeve 74. Sleeve 74 engages a shoulder on the sleeve 69 and forms a part of the anchor means for a sealing means 75 which prevents air from entering the chamber 17 at this area yet allows longitudinal movement of the sleeve assembly 69–74.

Plate 72 forms, as can be appreciated, part of the diaphram means 18 so that the sleeve and rod 68 move in unison therewith. Thus, movement of the rod by the operation of the diaphragm to the right or to the left will move the shuttle 43 in a corresponding manner.

To have the amount of air at a predetermined pressure flow out the main outlet 13 regulated by the second stage valve S–2 a small portion of the flow therethrough is metered by a passage 16, previously mentioned, which enters into the chamber 17 also previously mentioned. Proper selection of the compression of the springs 20 against which the diaphragm means 18 reacts is accomplished, in the embodiment illustrated, by utilizing a pair of helical springs 76, 77, of different compressibility rates which seat at each end in caps 78 and 80; cap 78 being adjustable by 3 set screws, one of which is illustrated and indicated in its entirety as 81, suitably fixed to a stationary cap member 82 which telescopingly receives cap 78 and is affixed or forms part of the valve body 11. Sealing diaphragm 18 is sealed between the valve body 11 and the stationary cap member 82 and between plates 72 and 73 to prevent leakage out of chamber 17.

In the operation of the valve, the backing plate 72 engages a first stop means 83 for one position of minimum output for valve S–2 and plate 73 engages a second stop means 84 in its second position which is the position of maximum flow from the valve S–2. It is to be noted that the area subject to pressure on the diaphragm means 18 is considerably large whereas the passage 16, metering the flow to the chamber 17 is relatively small, which makes the valve less subject to major variations of pressure in the main outlet 13 thus reducing any hunting or over-shooting as the flow varies in passage 13 depending upon the requirements of the system, yet at the same time, because of the sensitivity of valve S–2, variations in output pressure can be closely regulated. In the practical embodiment of this invention it has been found that at 30 p.s.i. the variation can be held to as little as ¼ p.s.i. in 5 to 15 cubic feet of air flow per minute.

While we have described our invention in connection with one specific embodiment thereof, it is to be understood that is by way of illustration and not by way of limitation and that the scope of our invention is defined solely by the appended claims which should be construed as broadly as the prior art will permit.

We claim:

1. A pressure reducing valve comprising a housing having a bore formed therein, means defining a valve spool having spaced lands thereon defining with said bore a chamber for air pressure, an inlet in communication with said chamber, an outlet in communication with said chamber adjacent one of said lands adapted to throttle the flow of air from said chamber through said outlet, means to reduce the force necessary to move said spool within said bore comprising means communicating air under pressure from said chamber to the periphery of said spool so that said air so communicated to said periphery defines an air bearing means about the periphery of said spool encompassing said lands, pressure responsive means including an axially shiftable diaphragm member connected for axial adjustment to said spool by coupling means including a rod to transmit axial forces therebetween, said rod having a reduced portion adjacent said spool to permit flexing to accommodate limited transverse movement of said diaphragm and said coupling means including a sleeve member surrounding the end portion of said rod and having a threaded collet positioned thereon with means on said collet for clamping said sleeve on said rod at a selected position of axial adjustment with respect to said diaphragm, and means for applying actuating fluid pressure to said diaphragm, said last mentioned means including a fluid passage from the outlet of said valve having a restricted flow area to dampen axial movement of said diaphragm, said pressure responsive means being suitable to move said spool within said bore.

2. A pressure reducing valve comprising a housing having a bore formed therein, means defining a valve spool having spaced lands thereon defining with said bore a chamber for air pressure, an inlet in communication with said chamber, an outlet in communication with said chamber adjacent one of said lands adapted to throttle the flow of air from said chamber through said outlet, means to reduce the force necessary to move said spool within said bore comprising means communicating air under pressure from said chamber to the periphery of said spool so that said air so communicated to said periphery defines an air bearing means about the periphery of said spool encompassing said lands, pressure responsive means including an axially shiftable diaphragm member connected for axial adjustment to said spool by coupling means including a rod to transmit axial forces therebetween, said rod having a reduced portion adjacent said spool to permit flexing to accommodate limited transverse movement of said diaphragm, means for applying actuating fluid pressure to said diaphragm, said last mentioned means including a fluid passage from the outlet of said valve having a restricted flow area to dampen axial movement of said diaphragm, said pressure responsive means being suitable to move said spool within said bore, and a seal provided on said coupling means to prevent leakage between the chamber of said diaphragm and the outlet of said valve along said rod, said seal including a flexible member connected at its inner extremity to said coupling means for axial movement therewith and anchored at its outer extremity to the adjacent wall of said valve.

References Cited in the file of this patent

UNITED STATES PATENTS

| | | |
|---|---|---|
| 515,968 | Richardson | Mar. 6, 1894 |
| 718,694 | Chapman | Jan. 20, 1903 |
| 2,320,886 | Quirzo | June 1, 1943 |
| 2,831,496 | Jensen | Apr. 22, 1958 |
| 2,908,158 | Jacobsson | Oct. 13, 1959 |
| 2,993,506 | Hillman | July 25, 1961 |

FOREIGN PATENTS

| | | |
|---|---|---|
| 405,050 | Great Britain | of 1934 |